(12) United States Patent
Huotari et al.

(10) Patent No.: US 7,992,919 B2
(45) Date of Patent: Aug. 9, 2011

(54) LIFT ASSIST SYSTEM

(75) Inventors: Keijo J. Huotari, Fenton, MI (US);
Stanley J. Krajenke, Croswell, MI (US); Stephen J. Lewis, Harrison Township, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 12/589,850

(22) Filed: Oct. 29, 2009

(65) Prior Publication Data
US 2011/0101729 A1 May 5, 2011

(51) Int. Cl.
*B60J 7/12* (2006.01)
(52) U.S. Cl. .................................. 296/122; 296/107.09
(58) Field of Classification Search ............ 296/107.01, 296/107.09, 111–118, 121, 122, 107.16, 296/98
See application file for complete search history.

(56) References Cited

U.S. PATENT DOCUMENTS

| | | | | |
|---|---|---|---|---|
| 2,076,243 | A * | 4/1937 | Marshall et al. | 296/107.09 |
| 6,295,713 | B1 * | 10/2001 | Hilliard et al. | 29/446 |
| 6,942,274 | B2 * | 9/2005 | Henning | 296/98 |
| 2006/0152033 | A1 * | 7/2006 | Schartner et al. | 296/107.09 |
| 2010/0109375 | A1 * | 5/2010 | Just et al. | 296/122 |

* cited by examiner

*Primary Examiner* — Dennis H Pedder
(74) *Attorney, Agent, or Firm* — Warn Partners, P.C.; Marc Luddy (57) ABSTRACT

A lift system for use with a foldable, stowable roof capable of being moved between a deployed position and a stowed position. The lift system includes at least one side link, with the side link as part of a frame assembly. The frame assembly supports a foldable roof, and both the frame assembly and the roof are operable for movement between a stowed position and a deployed position. A biasable member is operable with the side link for biasing the side link and the frame assembly toward the deployed position. When it is desired to move the frame assembly and roof from the stowed position to the deployed position, a reduced amount of force is applied to the frame assembly to move the frame assembly to the deployed position because of the force applied to the frame assembly from the biasable member.

21 Claims, 12 Drawing Sheets

LIFT ASSIST SYSTEM

FIELD OF THE INVENTION

The present invention relates to a lift assist system used for assisting in the repositioning of a foldable, stowable roof between a deployed position and a stowed position.

BACKGROUND OF THE INVENTION

Foldable stowable roof tops are commonly used in sport-utility vehicles for recreational purposes. The foldable roof can typically be moved between a stowed position, and a deployed position. When in the deployed position, the foldable roof will protect the occupants of the vehicle from various weather conditions. However, there are occasions where the weather is pleasant, and it is desired by the occupants of the vehicle to move the foldable roof to its stowed position such that the vehicle essentially functions without a roof, and the passenger compartment of the vehicle is exposed to the atmosphere. This allows the occupants of the vehicle to enjoy more favorable weather conditions while driving.

However, current designs for foldable, stowable roofs are often considered quite cumbersome to move between the stowed position and the deployed position. When changed from the stowed position to the deployed position, the occupant of the vehicle is required to lift and move the roof between various positions. The weight and size of the roof often increases the difficulty of moving the roof from the stowed position to the deployed position, or vice versa.

Accordingly, there exists a need for an improvement in the operation of a foldable, stowable roof for a vehicle that is capable of movement between a stowed position and a deployed position.

SUMMARY OF THE INVENTION

The present invention is a lift system for use with a foldable, stowable roof capable of being moved between a deployed position and a stowed position. The lift system according to the present invention includes at least one side link, with the side link being part of a frame assembly. The frame assembly supports a foldable roof, and both the frame assembly and the roof are operable for movement between a stowed position and a deployed position.

The lift system of the present invention also includes a main bracket attached to the main frame of a vehicle. The side link is pivotally connected to the main bracket and rotates relative to the main bracket. A biasable member in the form of a return spring is operable with the side link for applying a force to, or biasing, the side link and the frame assembly toward the deployed position. When the frame assembly and foldable, stowable roof are in the stowed position, and it is desired to move the frame assembly and stowable roof to the deployed position, a reduced amount of force is applied to the frame assembly to move the frame assembly to the deployed position because of the force applied to the frame assembly from the biasable member. This allows the owner/occupant of the vehicle to change the roof and frame assembly from the stowed position to the deployed position with relative ease.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

An embodiment of a lift assist system attached to a vehicle is shown in the Figures generally at 10. The vehicle 12 includes a main frame 14; the frame 14 for this particular vehicle 12 protects the vehicle occupants in the event of a rollover accident. Attached to the frame 14 is a moveable frame assembly, generally shown at 16, which is part of a foldable, stowable roof, generally shown at 18.

The frame assembly 16 includes various linkages, cross members, and pivot connections which are used for allowing the roof 18 to be moved between stowed and deployed positions. More specifically, the frame assembly 16 includes a main front support 20 and a main rear support 22. Connected to the main front support 20 is front side link 24. The front side link 24 is connected to the main front support 20 on a first end, and a second end of the front side link 24 is pivotally connected to an intermediate side link 26. Pivotally connected to the front side link 24 is a first upper link 28, and the first upper link 28 is also pivotally connected to a second upper link 30. Pivotally connected to the upper links 28,30 is a front cross member 32. The intermediate side link 26 is pivotally connected to a flange portion 34, and the intermediate flange portion 34 is connected to a first rear side link 36. The flange portion 34 is also connected to a middle cross member 38.

The first rear side link 36 is part of a lift assist system, generally shown at 40, according to the present invention. Also part of the system 40 is a second rear side link 42, and connected to the second rear side link 42 is an outer flange portion 44, as well as a rear cross member 46. The system 40 also includes a main bracket 48 connected to the main frame 14. The rear side links 36,42 are both pivotally connected to the main bracket 48. More specifically, the first rear side link 36 is connected to the main bracket 48 through the use of a top pivot mechanism, generally shown at 50, and the second rear side link 42 is connected to the main bracket 48 through the use of a bottom pivot mechanism, generally shown at 52.

Figure 11:
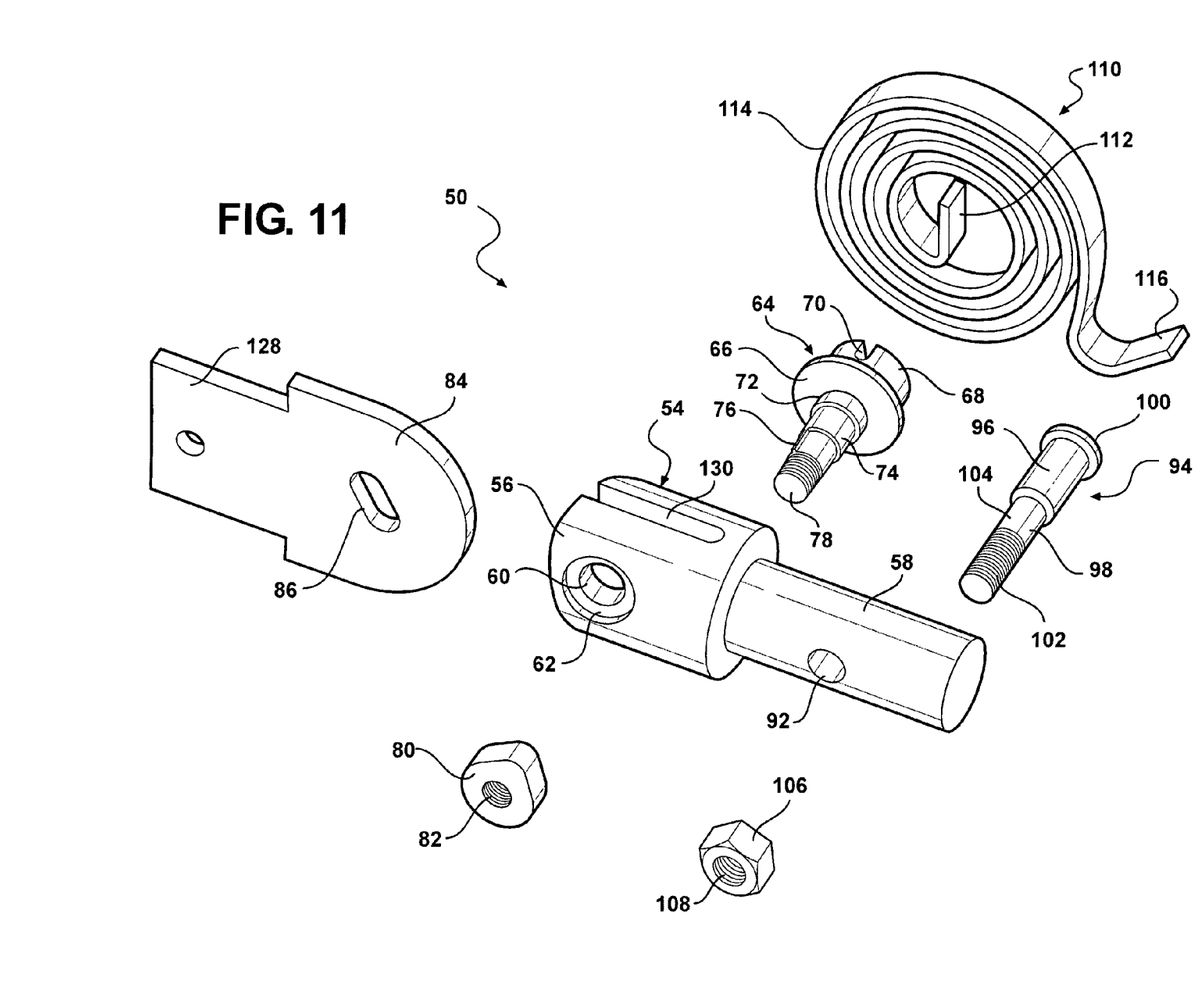
FIG. 11 is a exploded view a portion of a lift system, according to the present invention.
Figure 12:
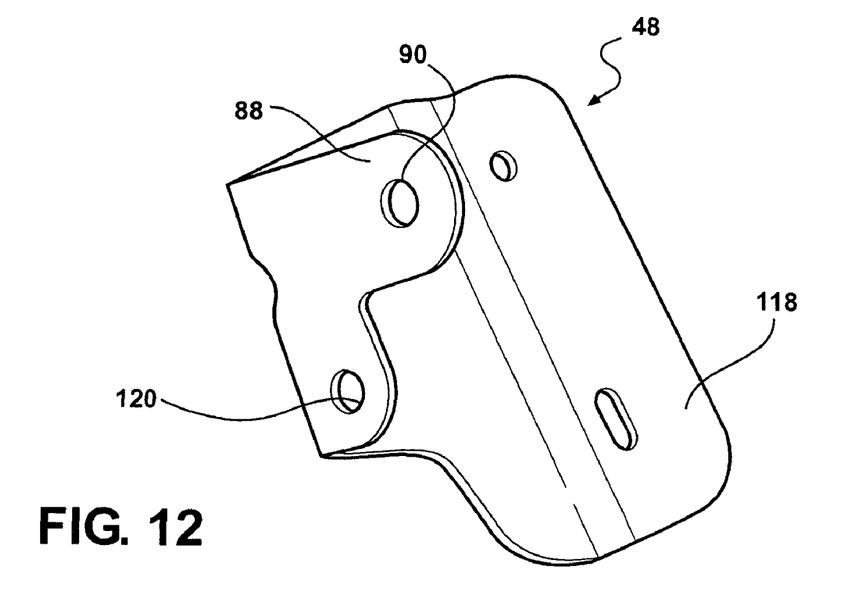
FIG. 12 is a perspective view of a main bracket used in a lift system, according to the present invention.
Figure 13:
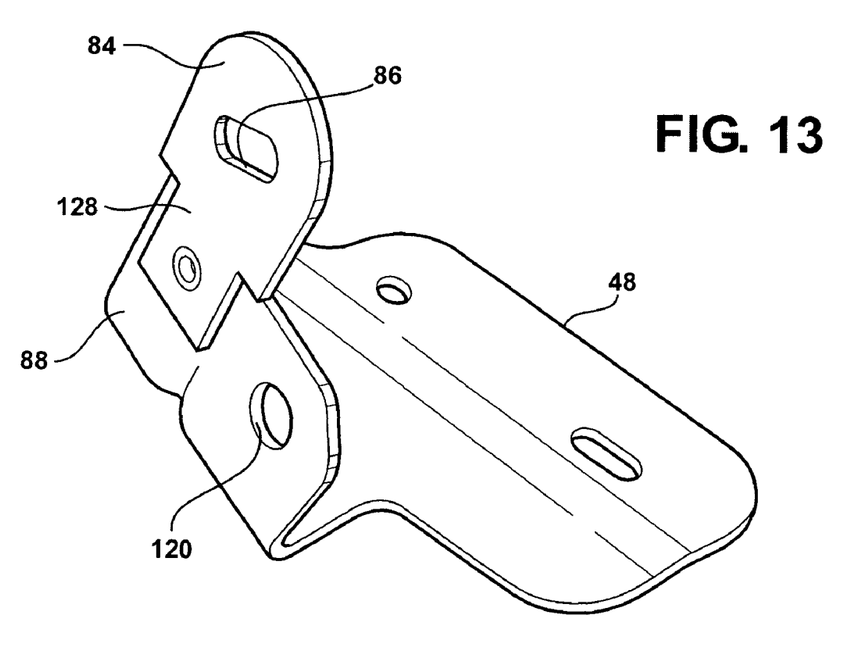
FIG. 13 is a perspective view of a main bracket and keeper plate used in a lift system, according to the present invention.
Figure 14:
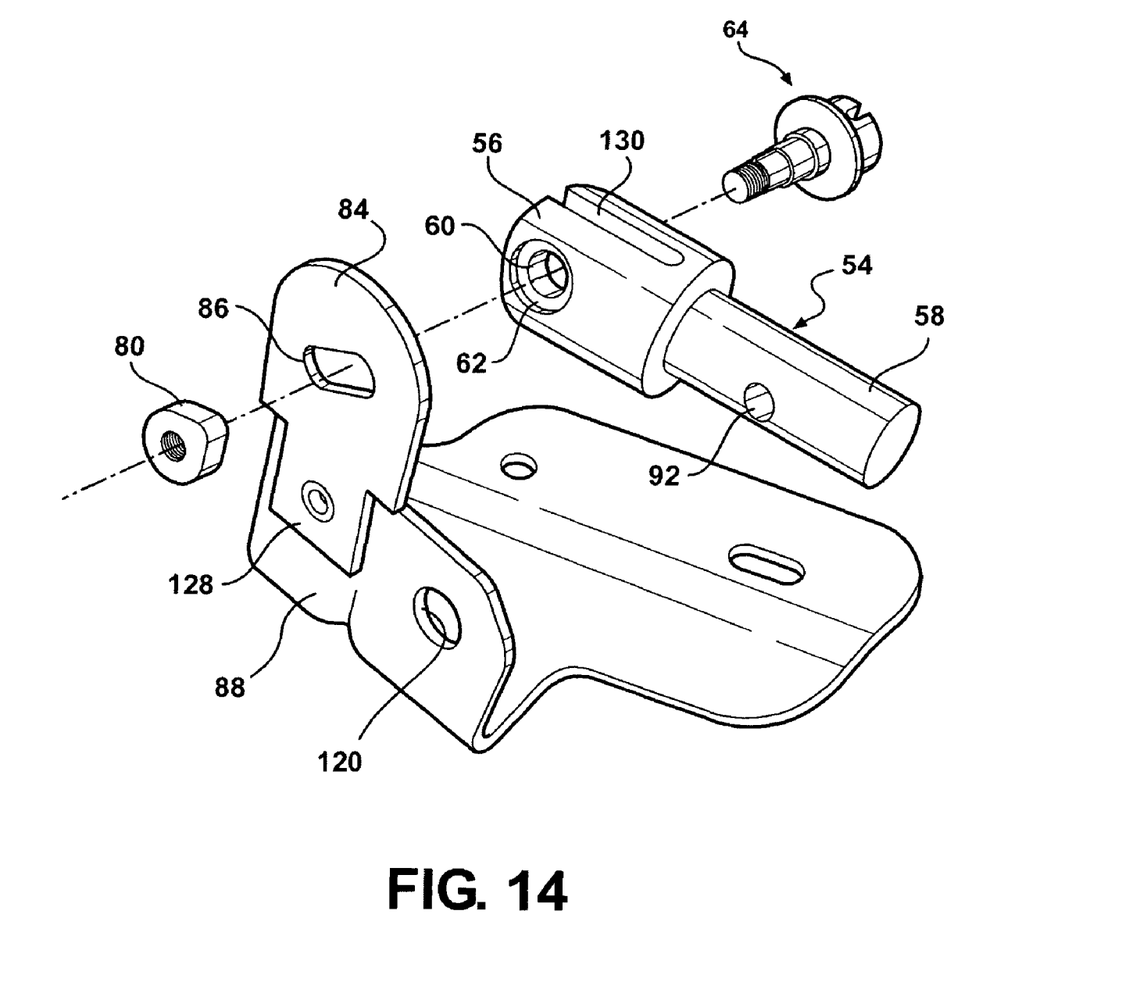
FIG. 14 is an exploded view of a main bracket, keeper plate, pivot knuckle, and pivot pin used for a lift system, according to the present invention.
Figure 15:
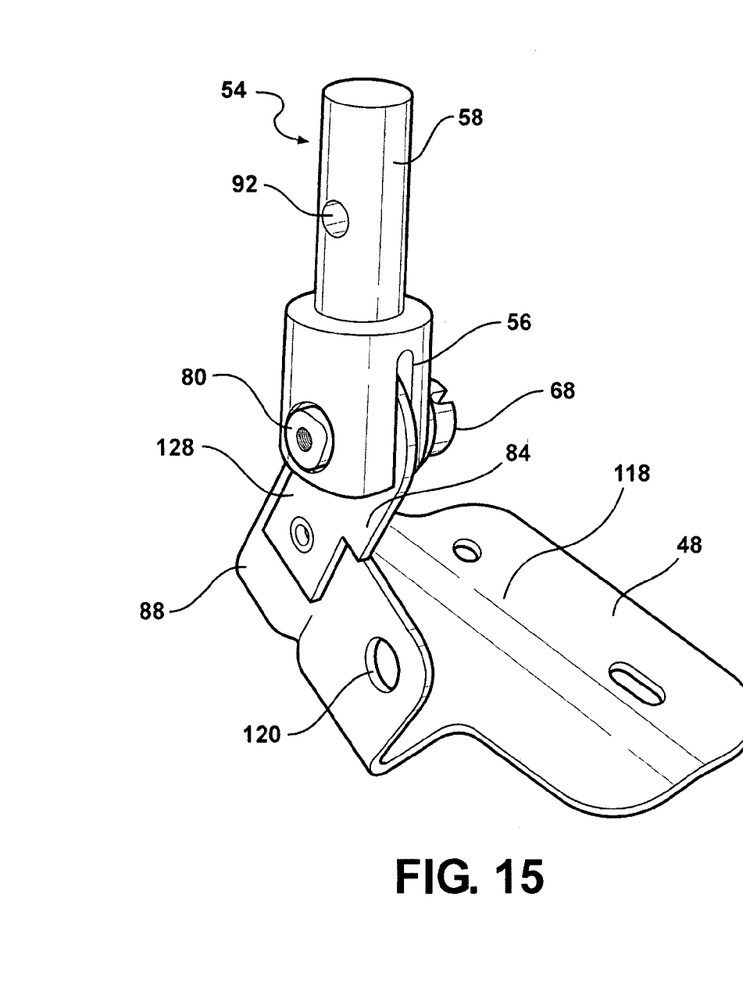
FIG. 15 is a first perspective view of a pivot knuckle and keeper plate connected to a main bracket used for a lift system, according to the present invention.
Figure 16:
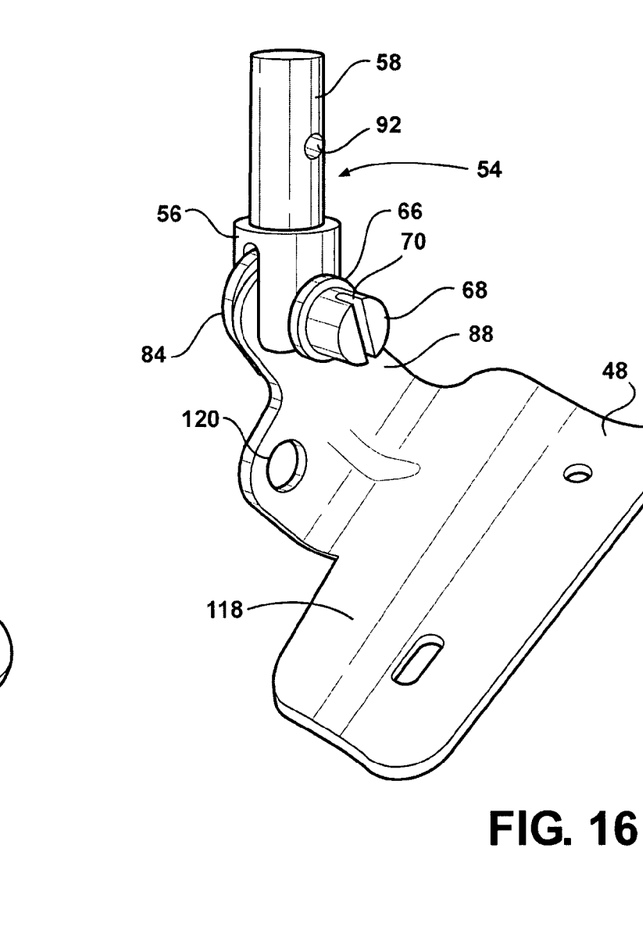
FIG. 16 is a second perspective view of a pivot knuckle and keeper plate connected to a main bracket used for a lift system, according to the present invention.

The top pivot mechanism 50 includes a pivot knuckle, generally shown at 54; the pivot knuckle 54 includes a base portion 56 and a pin portion 58. The base portion 56 is larger in diameter compared to the pin portion 58, best seen in FIG. 11. The base portion 56 also includes a base aperture 60 having a recessed portion 62, and a slot 130. Operable for extending through the base aperture 60 is a first pin or pivot pin, generally shown at 64. The pivot pin 64 includes a lip portion 66, a large diameter portion 68 having a slot 70, a medium diameter portion 72, and a small diameter portion 74 which includes a pair of projections 76. Extending from the small diameter portion 74 is a threaded portion 78, which is even smaller in diameter than the small diameter portion 74. The threaded portion 78 extends into a lock nut 80, which has a threaded aperture 82 and fastens to the threaded portion 78 of the pivot pin 64 as shown in the Figures.

Also included as part of the top pivot mechanism 50 is a keeper plate 84 having an oval-shaped slot 86. The keeper plate 84 is mounted for permanent connection with a flanged portion 88 of the main bracket 48. In this embodiment, the keeper plate 84 includes a narrow flange 128 which is connected to the flanged portion 88 through the use of a rivet connection 130. The flanged portion 88 also has an aperture 90 in which the pivot pin 64 extends. When assembled, the medium diameter portion 72 of the pivot pin 64 rests against the base portion 56 of the pivot knuckle 54. The keeper plate 84 and flanged portion 88 of the main bracket 48 are inserted into a slot 130 of the base portion 56. The slot 130 intersects the base aperture 60 such that the small diameter portion 74 of the pivot pin 64 extends through the base aperture 60. The small diameter portion 74 also extends through the slot 86 and the aperture 90, and the projections 76 extend through the oval-shaped slot 86 of the keeper plate 84, preventing relative rotation between the pivot pin 64 and the keeper plate 84, and thereby also preventing relative rotation between the pivot pin 64 and the main bracket 48. The threaded portion 78 will extend out of the base aperture 60 and into the threaded aperture 82 of the lock nut 80 thereby having a threaded connection between the lock nut 80 and the pivot pin 64, securing the pivot pin 64 in the base aperture 60. When fully secured, a washer 132 adjacent the lock nut 80 is positioned in the recessed portion 62.

The pin portion 58 of the pivot knuckle 54 also includes a pin aperture 92, which receives a second pin or anchor pin, generally shown at 94, having a large diameter portion 96 and a small diameter portion 98, and a head portion 100. The small diameter portion 98 includes a threaded portion 102 and a non-threaded portion 104. When assembled, the anchor pin 94 extends through the pin aperture 92 such that the large diameter portion 96 abuts a washer 134, and the washer 134 abuts the first rear side link 36 as shown in FIGS. 6-10, and the small diameter portion 98 extends through the first rear side link 36 and the pin aperture 92, and at least part of the threaded portion 102 extends out of the pin aperture 92, and a lock nut 106 having a threaded aperture 108 is fastened to the threaded portion 102, securing the anchor pin 94 to the first rear side link 36.

Attached to both the anchor pin 94 and the pivot pin 64 is a biasable member or return spring, generally shown at 110. The return spring 110 includes a first end 112 located at the center of a coil portion 114, and a second end 116 located on the outer periphery of the coil portion 114. The first end 112 is substantially straight, and when assembled is located in the slot 70 of the pivot pin 64. The second end 116 is angled as shown in FIGS. 6-11, and when assembled, rests against the large diameter portion 96 of the anchor pin 94, best seen in FIGS. 6-10.

The main bracket 48 is connected to the main frame 14 through welding, or another suitable connection. The main frame 14 is this embodiment is of a circular cross-section, but it is within the scope of the invention that the main bracket 48 may be shaped to match the contour of a frame having a different cross-section, such as square, rectangular, oval, or the like. In this embodiment, the main bracket 48 includes a contoured portion 118 which matches the surface of the main frame 14 having a circular cross-section, allowing the main bracket 48 to fully contact the main frame 14. The flanged portion 88 also includes a second aperture 120, the bottom pivot mechanism 52 includes a lower pivot knuckle 122 which is connected to the flanged portion 88 through the use of a fastener 124, and the lower pivot knuckle 122 is connected to the second rear side link 42.

Figure 1:
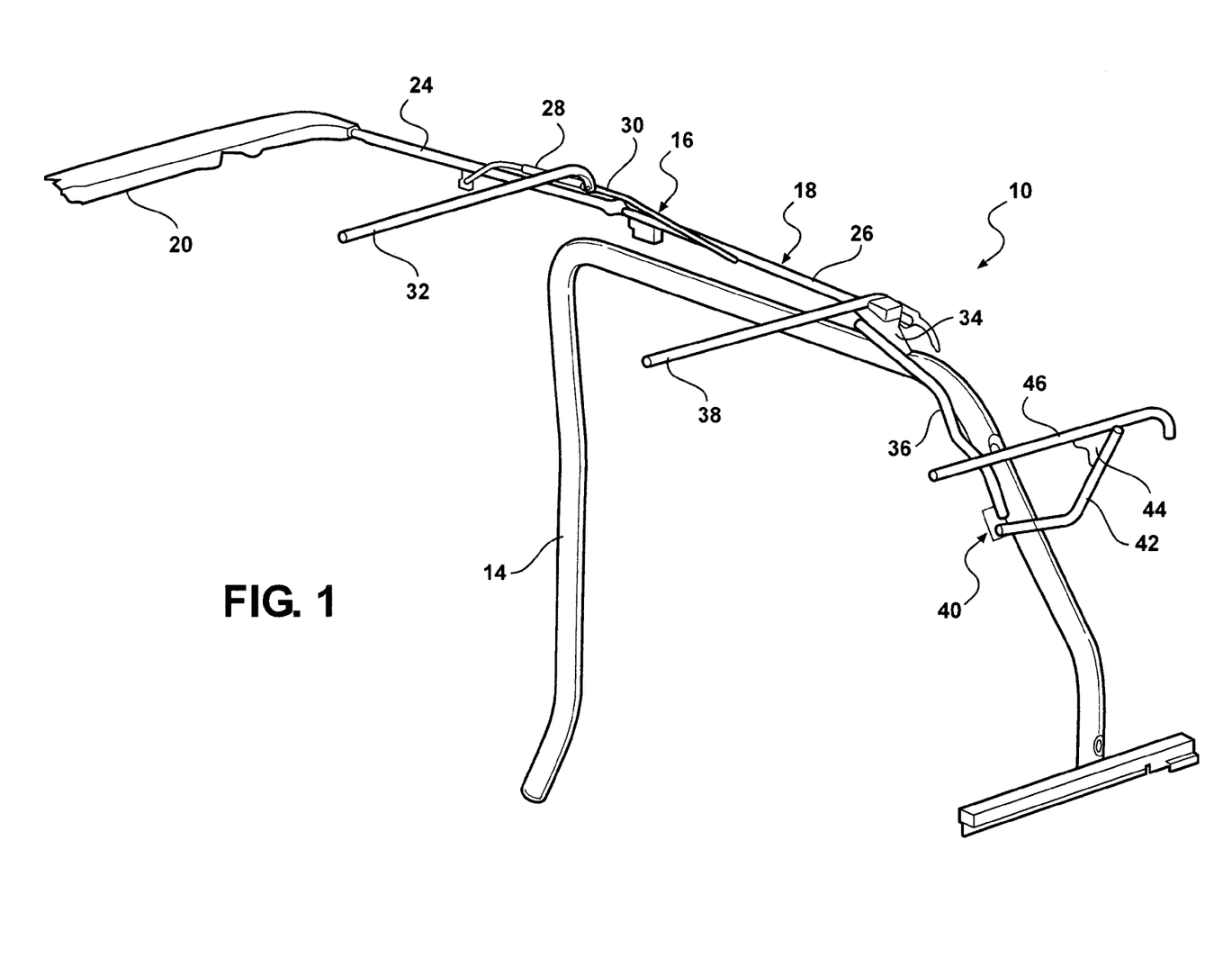
FIG. 1 is a sectional view of a frame assembly in a deployed position used with a foldable, stowable roof having a lift system, according to the present invention.
Figure 2:
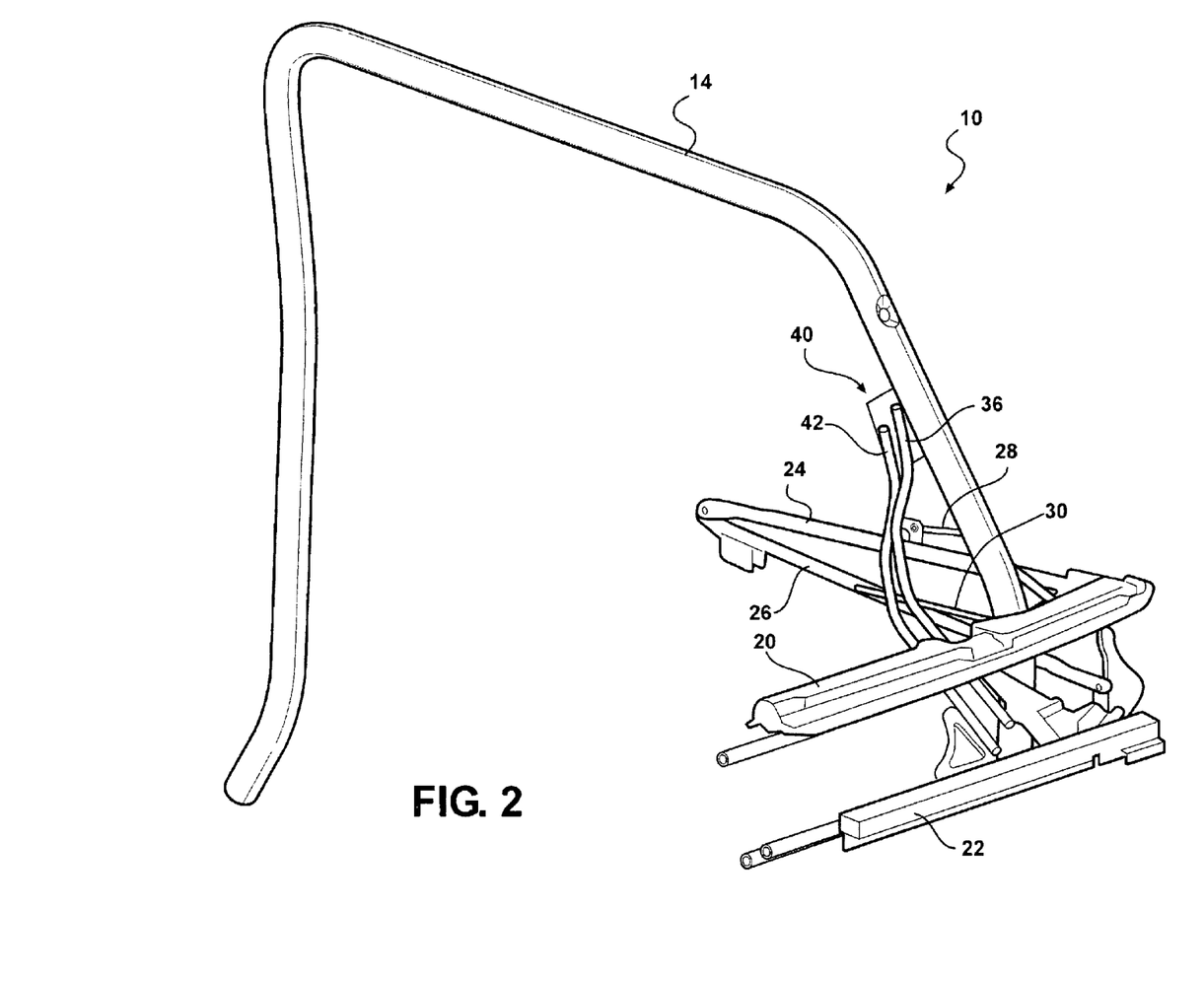
FIG. 2 is a sectional view of a frame assembly in a stowed position used with a foldable, stowable roof having a lift system, according to the present invention.
Figure 3:
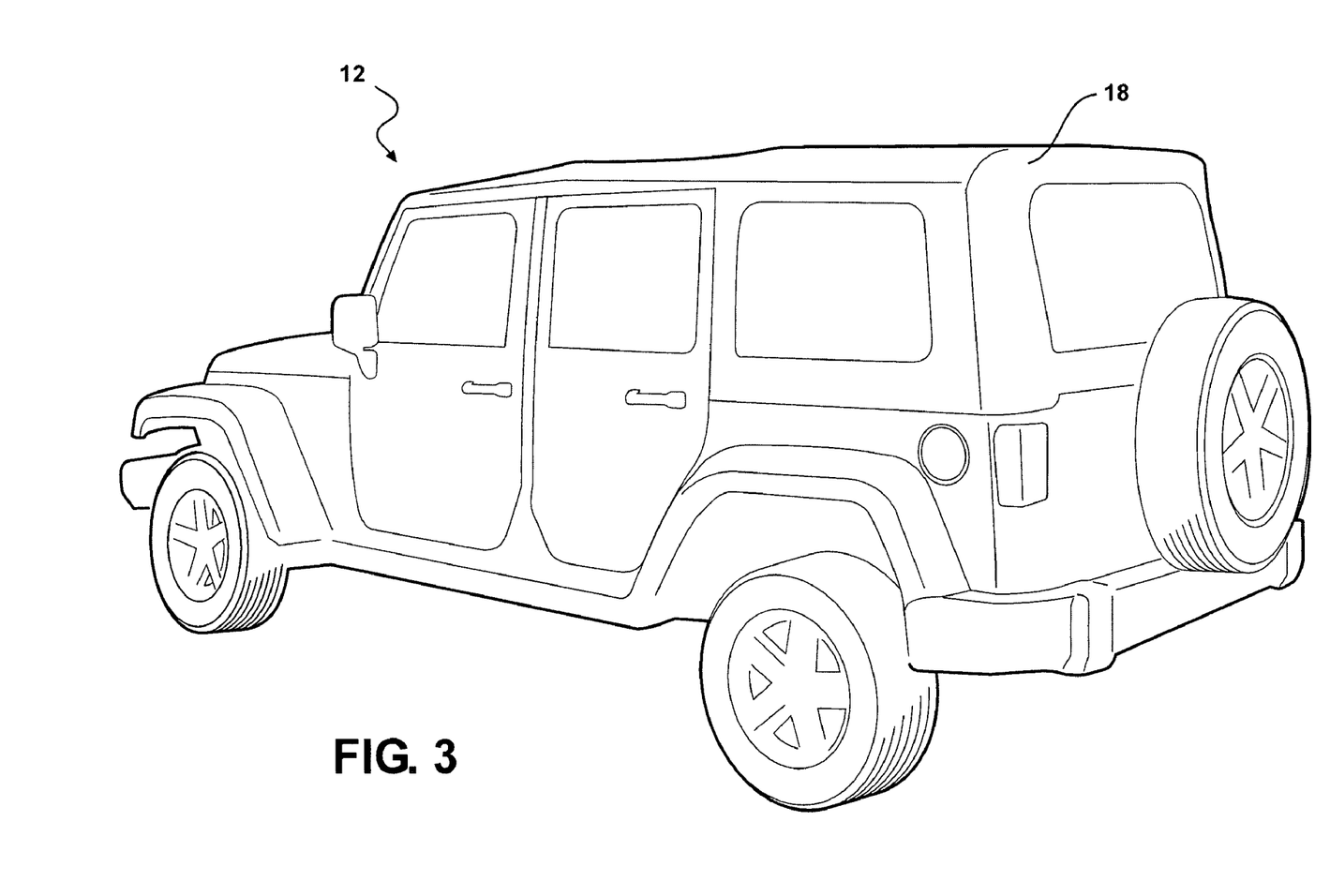
FIG. 3 is a perspective view of vehicle having a frame assembly and a foldable, stowable roof in a deployed position incorporating a lift system according to the present invention.
Figure 4:
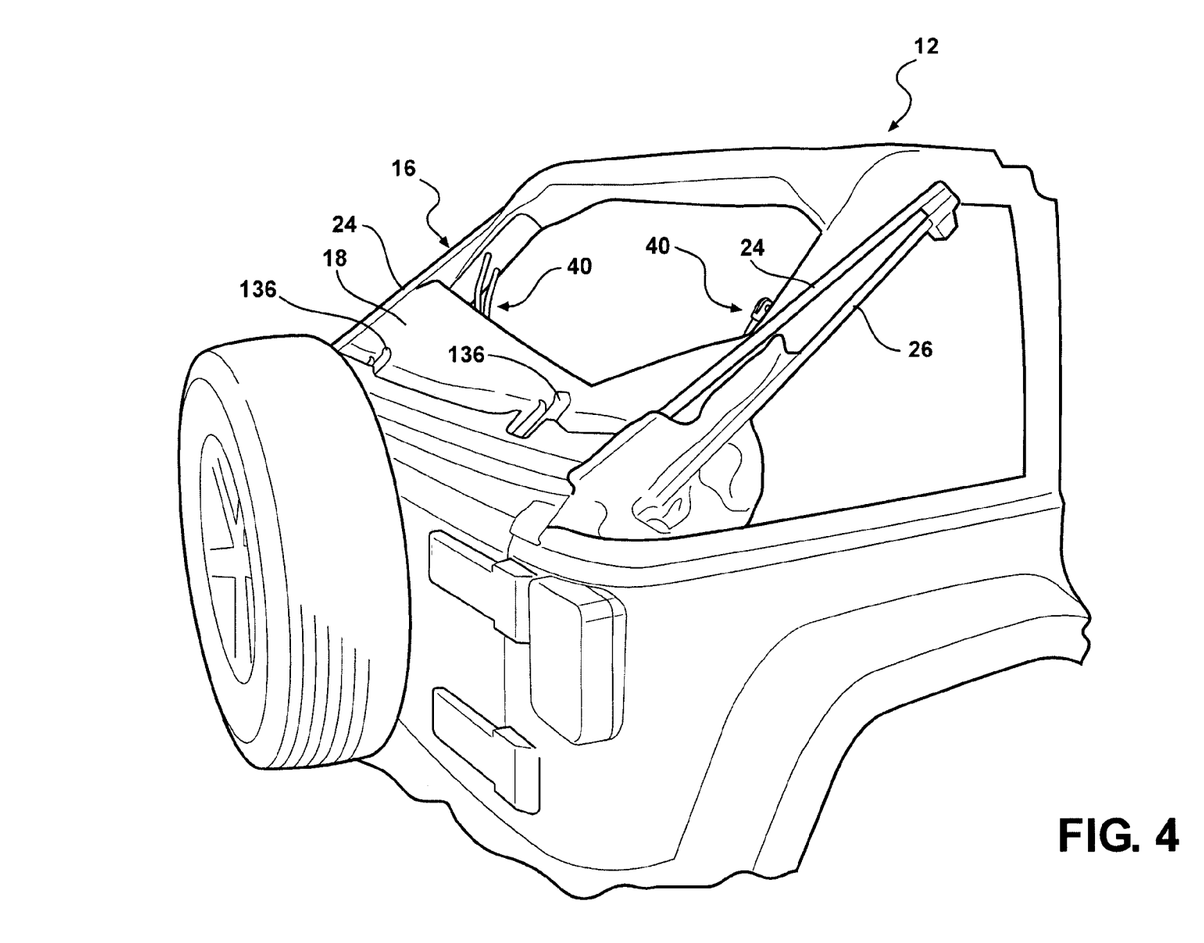
FIG. 4 is first perspective view of a vehicle having a frame assembly and a foldable, stowable roof in a stowed position, incorporating a lift system according to the present invention.
Figure 5:
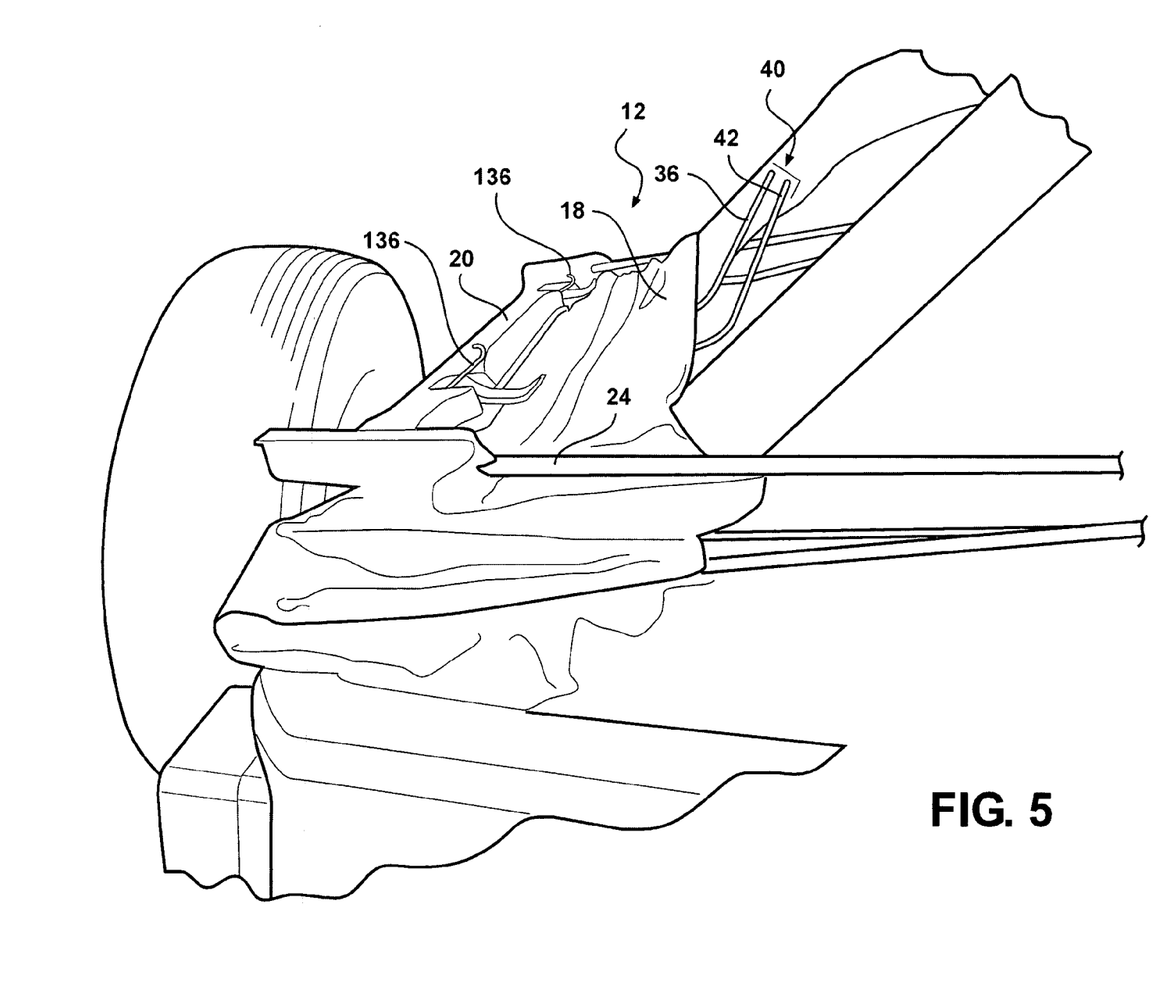
FIG. 5 is second perspective view of a vehicle having a frame assembly and a foldable, stowable roof in a stowed position, incorporating a lift system according to the present invention.
Figure 6:
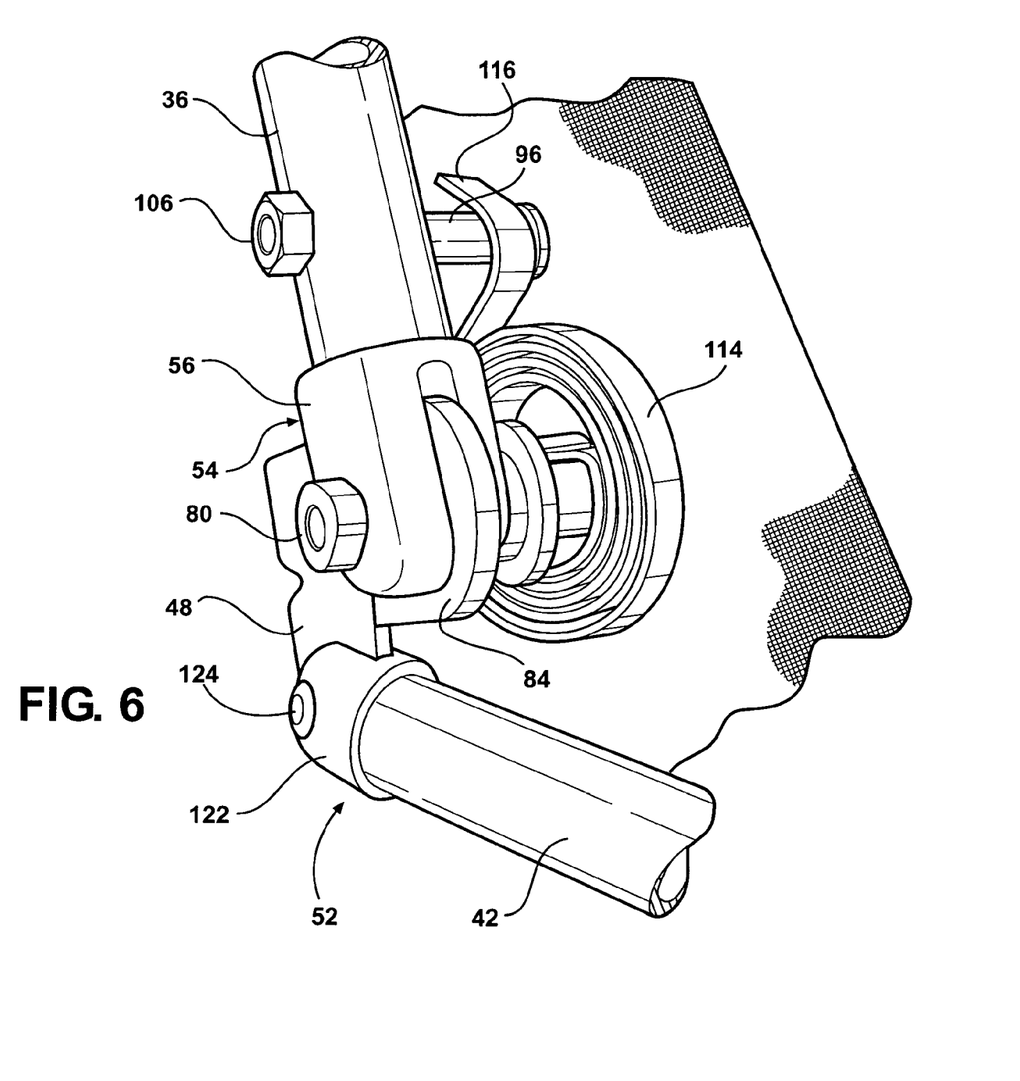
FIG. 6 is a first perspective view of a portion of a lift system in a deployed position, according to the present invention.
Figure 7:
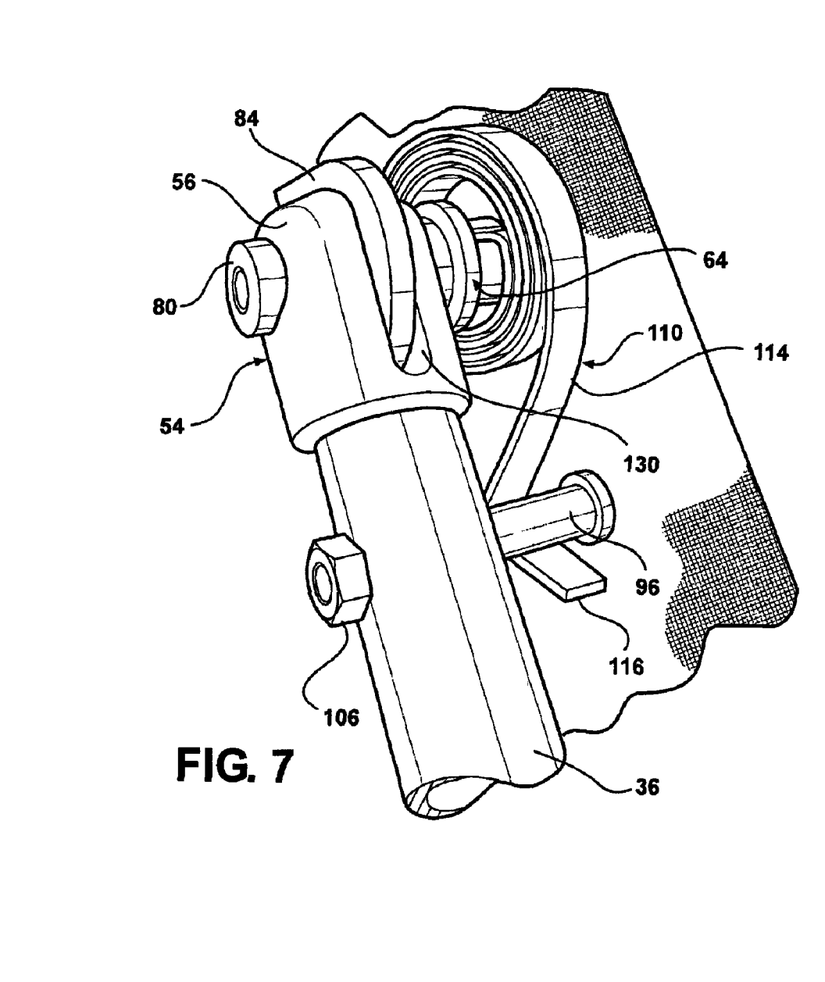
FIG. 7 is a first perspective view of a portion of a lift system in a stowed position, according to the present invention.
Figure 8:
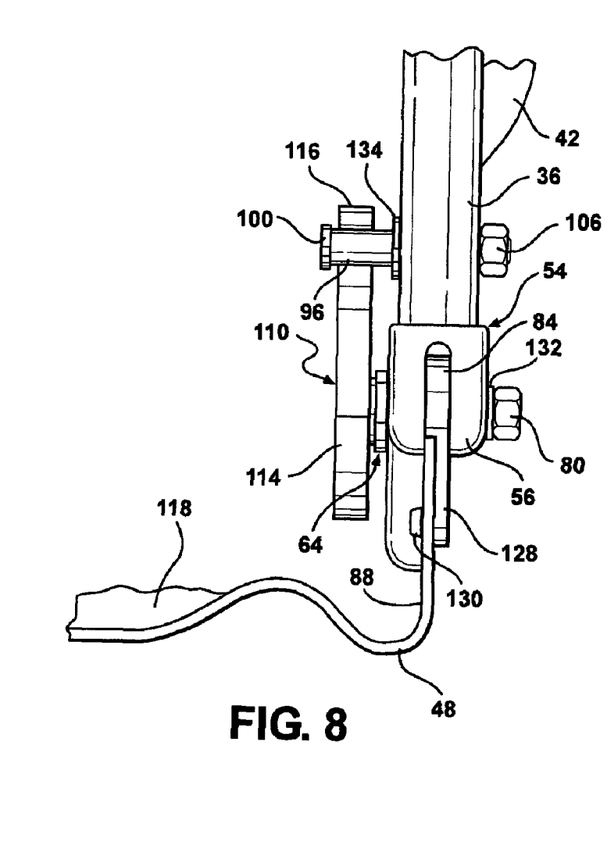
FIG. 8 is a bottom view of a portion of a lift system in a stowed position, according to the present invention.
Figures 9, 10:
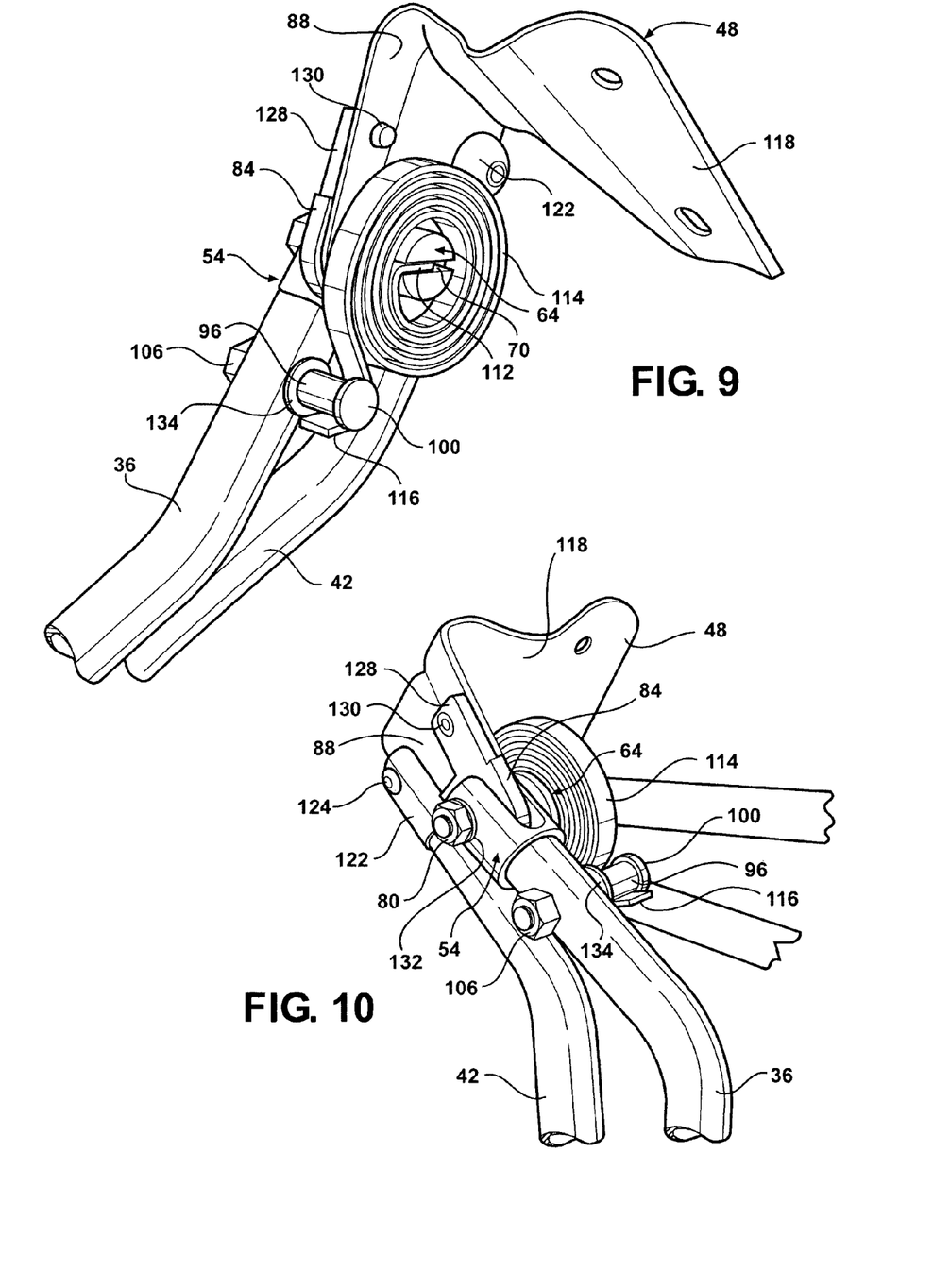
FIG. 9 is a second perspective view of a portion of a lift system in a stowed position, according to the present invention.
FIG. 10 is a third perspective view of a portion of a lift system in a stowed position, according to the present invention.

In operation, the frame assembly 16 and roof 18 are in the deployed position shown in FIG. 3. When it is desired to move the roof 18 to the stowed position, there are latches 136 which connect the main front support 20 to a windshield frame 126 which are released. The frame assembly 16 and roof 18 are folded such that the front side link 24 pivots relative to the intermediate side link 26 and the first upper link 28, the first upper link 28 pivots relative to the second upper link 30, and the second upper link 30 pivots relative to the intermediate side link 26. At the same time, the intermediate side link 26 and the first rear side link 36 will pivot relative to one another, the first rear side link 36 will pivot relative to the main bracket 48, and the second rear side link 42 will also pivot relative to the main bracket 48. The links 24,26,28,30,36,42 will move from the deployed position shown in FIGS. 1, 3, and 6, to the stowed position shown in FIGS. 2, 4-5, and 7-10.

As the frame assembly 16 and roof 18 are moved from the deployed position to the stowed position, the first rear side link 36 will pivot relative to the main bracket 48 as mentioned above. As this occurs, the anchor pin 94 rotates about the pivot pin 64 because the pivot knuckle 54 also rotates relative to the pivot pin 64. Tension in the return spring 110 increases, and is at a maximum amount when the frame assembly 16 and roof 18 are in the stowed position. The anchor pin 94 applies force to the second end 116 of the spring 110, and the first end 112 remains stationary in the slot 70 because the pivot pin 64 is prevented from rotating due to the projections 76 being disposed in the oval-shaped slot 86 formed as part of the keeper plate 84, and the keeper plate 84 being fixed to the flanged portion 88. The tension in the return spring 110 therefore exerts a force to bias the rear side link 36 (and therefore all of the remaining links 24,26,28,30,42 because of their connection with one another and the roof 18, and the unitary movement as described above) toward the deployed position. When the owner/occupant of the vehicle 12 desires to change the frame assembly 16 and roof 18 from the stowed position to the deployed position, the owner/occupant simply applies a force to one or more of the main front support 20, the cross members 32,38,46, or the links 24,26,28,30,36,42, and the tension in the return spring 110 will aid in the movement of the frame assembly 16 and the roof 18 from the stowed position to the deployed position because of the force applied to the anchor pin 94 from the return spring 110, which generates a moment about the pivot pin 64 to bias the frame assembly 16 and roof 18 toward the deployed position.

One of the advantages of the present invention is that the lift assist system 40 provides easier movement of the frame assembly 16 and the roof 18 from the stowed position to the deployed because a reduced amount of force is applied to the frame assembly 16 because of the force applied by the return spring 110. Additionally, the lift assist system 40 of the present invention may also be installed after the manufacturing process is completed and the vehicle is assembled, or during the manufacturing process while the vehicle is being assembled. While the figures show two lift assist systems 40 on each side of the frame assembly 16, it is within the scope of the invention that one of the lift assist systems 40 may be used, instead of two.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A lift system having a frame assembly, comprising:
   at least one side link, said at least one side link is part of a frame assembly, and said frame assembly is movable between a stowed position and a deployed position;
   a main bracket attached to a frame of a vehicle, said at least one side link pivotally connects to said main bracket for rotation relative to said main bracket;
   a biasable member for biasing said at least one side link and said frame assembly toward said deployed position;
   a pivot knuckle in a pivoting relationship with said main bracket, said at least one side link pivotally connected to said main bracket through the use of said pivot knuckle;
   a first pin extending through a portion of said pivot knuckle and a portion of said main bracket to provide said pivoting relationship between said main bracket and said pivot knuckle;
   a second pin extending through a portion of said pivot knuckle and a portion said at least one side link for connecting said at least one side link to said pivot knuckle, said biasable member in contact with said first pin and said second pin such that said biasable member applies a force to said first pin and said second pin when said at least one side link is moved from said deployed position to said stowed position; and
   a keeper plate mounted to said main bracket to prevent the rotation of said first pin relative to said main bracket as said at least one side link pivots relative to said main bracket and said biasable member generates a force in opposition to the rotation of said at least one side link as said at least one side link moves from said deployed position to said stowed position.

2. The lift system of claim 1, said pivot knuckle further comprising:
   a base portion;
   a slot formed as part of said base portion of said pivot knuckle, and a portion of said keeper plate and a portion of said main bracket are located in said slot formed as part of said base portion of said pivot knuckle;
   a base aperture formed as part of said base portion of said pivot knuckle and intersecting said slot formed as part of said pivot knuckle, said pivot pin extending through said base aperture formed as part of said base portion of said pivot knuckle, said pivot pin also extending through said portion of said main bracket and said portion of said keeper plate located in said slot formed as part of said base portion of said pivot knuckle, securing said pivot knuckle to said keeper plate and said main bracket;
   a pin portion connected to said base portion; and
   a pin aperture formed as part of said pin portion, said pin portion extending into said at least one side link such that a portion of said second pin extends through an aperture formed as part of said at least one side link and said pin aperture, thereby securing said at least one side link to said pivot knuckle.

3. The lift of claim 2, wherein said first pin is a pivot pin, further comprising:
   a large diameter portion;
   a slot formed as part of said large diameter portion of said pivot pin, a portion of said biasable member received into said slot formed as part of said large diameter portion of said pivot pin;
   a medium diameter portion;
   a small diameter portion having a non-threaded portion, said non-threaded portion extending through both of said portion of said main bracket and said portion of said keeper plate disposed in said slot formed in said base portion of said pivot knuckle;
   a lip portion disposed between said large diameter portion and said medium diameter portion;
   at least one protrusion formed as part of said small diameter portion extending into an oval-shaped slot formed as part of said keeper plate, thereby preventing the rotation of said pivot pin relative to said main bracket and said keeper plate;
   a threaded portion extending through both of said portion of said main bracket and said portion of said keeper plate disposed in said slot formed in said base portion of said pivot knuckle and out of said base aperture formed as part of said base portion of said pivot knuckle; and
   a lock nut fastened to said threaded portion, thereby securing said pivot pin to said main bracket, said keeper plate, and said pivot knuckle.

4. The lift system of claim 3, wherein said biasable member is a return spring further comprising:
   a first end substantially disposed in said slot formed in said large diameter portion of said pivot pin, said first end being substantially straight;
   a second end in the form of an angled portion in contact with said second pin; and
   a coil portion disposed between said first end and said second end such that the tension in said coil increases as said at least one side link moves from said deployed position to said stowed position, biasing said at least one side link toward said deployed position.

5. The lift system of claim 3, said second pin further comprising an anchor pin having a large diameter portion and a small diameter portion, said small diameter portion of said pin extending through said at least one side link and said pivot knuckle to secure said at least one side link to said pivot knuckle, said biasable member in contact with said large diameter portion of said anchor pin.

6. The lift system of claim 1, further comprising a roof attached to said frame assembly, wherein said roof is made of a foldable material such that said roof will fold when said roof is moved from said deployed position to said stowed position.

7. The lift system of claim 1, said at least one side link further comprising a first rear side link pivotally connected to said main bracket.

8. The lift system of claim 7, further comprising a second rear side link connected to said main bracket, said second rear side link a part of said frame assembly and is moved between said stowed position and said deployed position as said first rear side link is moved between said stowed position and said deployed position.

9. The lift system of claim 8, further comprising a lower pivot knuckle, wherein said second rear side link is connected to said main bracket through the use of said lower pivot knuckle.

10. A lift system for a foldable, stowable roof of a vehicle, comprising:
    a moveable, foldable, frame assembly movable between a stowed position and a deployed position;
    at least one side link, said at least one side link is a part of said frame assembly;
    a main bracket attached to a main frame of a vehicle, and said at least one side link pivotally connected to said main bracket;
    a pivot knuckle in a pivoting relationship relative to said main bracket, said at least one side link connected to said pivot knuckle for pivotally connecting said main bracket to said at least one side link;
    a first pin extending through a portion of said main bracket and said pivot knuckle for allowing relative rotation between said main bracket and said pivot knuckle;
    a second pin extending through said at least one side link and said pivot knuckle, securing said at least one side link to said pivot knuckle; and
    a biasable member in connection with said first pin and said second pin for biasing said at least one side link and said frame assembly toward said deployed position.

11. The lift system for a foldable, stowable roof of a vehicle of claim 10, said pivot knuckle further comprising:
    a base portion;
    a pin portion connected to said base portion;
    a base aperture extending through said base portion;
    a slot formed as part of said base portion, said base aperture of said base portion intersecting with said slot formed as part of said base portion, and a portion of said main bracket received by said slot formed as part of said base portion of said pivot knuckle; and
    a pin aperture formed as part of said pin portion, said second pin extending through said pin aperture formed as part of said pin portion and said at least one side link, thereby securing said at least one side link to said pivot knuckle.

12. The lift system for a foldable, stowable roof of a vehicle of claim 11, further comprising:
    a keeper plate attached to said main bracket, said keeper plate received into said slot formed as part of said base portion of said pivot knuckle; and
    a substantially oval-shaped slot formed as part of said keeper plate and aligned with an aperture formed as part of said main bracket, said first pin extending through said aperture formed as part of said main bracket, said oval-shaped slot formed as part of said keeper plate, and base aperture of said pivot knuckle to secure said pivot knuckle in pivot connection with said main bracket.

13. The lift system for a foldable, stowable roof of a vehicle of claim 12, wherein said first pin is a pivot pin, further comprising:
    a large diameter portion;
    a slot formed as part of said large diameter portion, a portion of said biasable member received into said slot formed as part of said large diameter portion of said pivot pin;
    a lip portion adjacent said large diameter portion;
    a medium diameter portion adjacent said lip portion;
    a small diameter portion adjacent said medium portion, said small diameter portion having a non-threaded portion, said non-threaded portion extending through said substantially oval-shaped slot formed as part of said keeper plate and said aperture of said main bracket;
    at least one protrusion formed as part of said small diameter portion of said pivot pin extending through said substantially oval-shaped slot formed as part of said keeper plate for preventing the rotation of said pivot pin relative to said main bracket and said keeper plate;
    a threaded portion extending through both of said portion of said main bracket and said portion of said keeper plate disposed in said slot formed in said base portion of said pivot knuckle and out of said base aperture formed as part of said base portion of said pivot knuckle; and
    a lock nut for fastening to said threaded portion of said small diameter portion of said pivot pin, securing the connection between said main bracket, said pivot pin, and said pivot knuckle.

14. The lift system for a foldable, stowable roof of a vehicle of claim 10, wherein said biasable member is a return spring further comprising:
    a first end shaped so as to fit into said slot formed in said large diameter portion of said pivot pin;
    a second end angled to contact said second pin; and
    a coil portion disposed between said first end and said second end, said coil portion generates a biasing force against the rotation of said at least one side link as said at least one side link is moved from said deployed position to said stowed position.

15. The lift system for a foldable, stowable roof of a vehicle of claim 10, wherein said second pin is an anchor pin, further comprising:
    a large diameter portion adjacent said at least one side link, said biasable member in contact with said large diameter portion of said second pin; and
    a small diameter portion extending through said at least one side link and said pivot knuckle for connecting said at least one side link to said pivot knuckle.

16. A lift system for a foldable, stowable roof of a vehicle, comprising:
    a first rear side link movable between a deployed position and a stowed position;
    a second rear side link movable between said deployed position and said stowed position;
    a frame assembly connected to and supporting a foldable, stowable roof in said stowed position and said deployed position, said frame assembly folds said roof in a predetermined manner when said frame assembly is moved from said deployed position to said stowed position, said first rear side link and said second rear side link are part of said frame assembly;

a main bracket connected to a main frame of a vehicle, said first rear side link and said second rear side link pivotally connected to said main bracket;

a pivot knuckle in pivot connection with said main bracket, said first rear side link connected to said pivot knuckle to allow said first rear side link to pivot relative to said main bracket;

a keeper plate mounted to said main bracket in proximity to said pivot knuckle;

a pivot pin extending through a portion of said main bracket, said keeper plate, and said pivot knuckle, said pivot knuckle is pivotable about said pivot pin;

an anchor pin extending through said first rear side link and said pivot knuckle, thereby connecting said first rear side link to said pivot knuckle; and a return spring in connection with said pivot pin and said anchor pin for biasing said first rear side link, said second rear side link, and said frame assembly toward said deployed position.

17. The lift system for a foldable, stowable roof of a vehicle according to claim 16, said pivot knuckle further comprising:

a base portion;

a slot formed as part of said base portion of said pivot knuckle, a portion of said main bracket and a portion of said keeper plate is disposed in said slot formed as part of said base portion of said pivot knuckle;

a base aperture extending through said base portion of said pivot knuckle such that said base aperture intersects said slot formed as part of said base portion of said pivot knuckle, at least a portion of said pivot pin extending through said base aperture of said base portion such that said pivot pin extends through both of said portion of said main bracket and said portion of said keeper plate disposed in said slot formed as part of said base portion;

a pin portion connected to said base portion and extending into a portion of said first rear side link; and a pin aperture formed as part of said pin portion, said anchor pin extending through said first rear side link and said pin aperture formed as part of said pin portion, securing said first rear side link to said pivot knuckle.

18. The lift system for a foldable, stowable roof of a vehicle according to claim 17, said anchor pin further comprising:

a large diameter portion, and said return spring is in contact with said large diameter portion of said anchor pin; and a small diameter portion extending through said first rear side link and said pin aperture formed as part of said pin portion of said pivot knuckle, securing said first rear side link to said pivot knuckle.

19. The lift system for a foldable, stowable roof of a vehicle according to claim 17, said pivot pin further comprising:

a large diameter portion;

a slot formed as part of said large diameter portion of said pivot pin, a portion of said return spring is received into said slot formed as part of said large diameter portion of said pivot pin;

a lip portion adjacent said large diameter portion of said pivot pin;

a medium diameter portion adjacent said lip portion of said pivot pin;

a small diameter portion adjacent said medium diameter portion of said pivot pin, said small diameter portion of said pivot pin having a non-threaded portion extending through both of said portion of said main bracket and said portion of said keeper plate disposed in said slot formed as part of said base portion of said pivot knuckle;

a threaded portion extending through both of said portion of said main bracket and said portion of said keeper plate disposed in said slot formed in said base portion of said pivot knuckle, and out of said base aperture formed as part of said base portion of said pivot knuckle; and a lock nut received onto said threaded portion of said small diameter portion of said pivot pin, thereby securing said pivot pin to said main bracket and said keeper plate.

20. The lift system for a foldable, stowable roof of a vehicle according to claim 19, further comprising:

at least one protrusion formed as part of said small diameter portion of said pivot pin; and a substantially oval shaped slot formed as part of said keeper plate, wherein said at least one protrusion formed as part of said small diameter portion of said pivot pin extends into said substantially oval-shaped slot, thereby preventing relative rotation between said pivot pin and both of said keeper plate and said main bracket.

21. The lift system for a foldable, stowable roof of a vehicle according to claim 19, said return spring further comprising:

a first end being substantially straight and at least partially disposed in said slot formed as part of said large diameter portion of said pivot pin, securing said first end of said return spring to said pivot pin;

a coil portion substantially surrounding said pivot pin, said first end is connected to said coil portion; and a second end connected to said coil portion, and in contact with said anchor pin such that as said first rear side link is pivoted from said deployed position to said stowed position, tension in the coil portion will increase, thereby biasing said first rear side link toward said deployed position.

* * * * *